(12) United States Patent
Garera et al.

(10) Patent No.: US 9,064,230 B2
(45) Date of Patent: Jun. 23, 2015

(54) RANKING KEYWORDS FOR PRODUCT TYPES WITH MANUAL CURATION

(71) Applicant: Wal-Mart Stores, Inc., Bentonville, AR (US)

(72) Inventors: Nikesh Lucky Garera, Mountain View, CA (US); Narasimhan Rampalli, Los Altos, CA (US); Dintyala Venkata Subrahmanya Ravikant, San Bruno, CA (US); Srikanth Subramaniam, San Jose, CA (US); Chong Sun, Redwood City, CA (US); Heather Dawn Yalin, Alameda, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 190 days.

(21) Appl. No.: 13/756,482

(22) Filed: Jan. 31, 2013

(65) Prior Publication Data

US 2014/0214633 A1  Jul. 31, 2014

(51) Int. Cl.
*G06Q 10/00* (2012.01)
*G06Q 10/08* (2012.01)
*G06Q 10/10* (2012.01)

(52) U.S. Cl.
CPC ............ *G06Q 10/087* (2013.01); *G06Q 10/101* (2013.01)

(58) Field of Classification Search
CPC .................................................... G06Q 10/101

USPC ............ 705/28, 300; 701/999.003, E17.062; 707/999.003, E17.062

See application file for complete search history.

(56) References Cited

U.S. PATENT DOCUMENTS

| | | |
|---|---|---|
| 6,526,440 B1 | 2/2003 | Bharat |
| 6,751,600 B1 | 6/2004 | Wolin |
| 6,785,671 B1 | 8/2004 | Bailey |
| 7,082,426 B2 | 7/2006 | Musgrove |
| 7,870,039 B1 | 1/2011 | Dom |
| 8,606,635 B2 | 12/2013 | Evankovich |
| 2002/0077930 A1 | 6/2002 | Trubey |
| 2002/0184116 A1 | 12/2002 | Tam |
| 2003/0120662 A1 | 6/2003 | Vishik |
| 2005/0149390 A1 | 7/2005 | Scholl |
| 2006/0095370 A1 | 5/2006 | Seth |
| 2006/0095430 A1 | 5/2006 | Zeng |
| 2006/0282339 A1 | 12/2006 | Musgrove |
| 2007/0226202 A1* | 9/2007 | Cava ................................. 707/4 |
| 2009/0299879 A1* | 12/2009 | Lu .................................. 705/27 |
| 2010/0057806 A1 | 3/2010 | Neal |
| 2010/0114855 A1 | 5/2010 | Li |
| 2012/0254060 A1 | 10/2012 | Choudhary |
| 2012/0330961 A1 | 12/2012 | Miao |
| 2013/0124303 A1* | 5/2013 | Kassem ..................... 705/14.45 |
| 2013/0246119 A1 | 9/2013 | Slaughenhoupt |
| 2013/0290320 A1* | 10/2013 | Zhu et al. ...................... 707/723 |
| 2014/0019244 A1 | 1/2014 | Gundapaneni |
| 2014/0025674 A1 | 1/2014 | Kritt |

* cited by examiner

*Primary Examiner* — Hunter Wilder
(74) *Attorney, Agent, or Firm* — Bryan Cave LLP (57) ABSTRACT

The present disclosure extends to methods, systems, and computer program products for automatically determining key words within item information with product types, and classifying new items within product types within a merchant's database.

14 Claims, 5 Drawing Sheets

RANKING KEYWORDS FOR PRODUCT TYPES WITH MANUAL CURATION

BACKGROUND

Retailers often have databases and warehouses full of thousands upon thousands of products offered for sale, with new product items being added and offered every day. Accordingly, the databases must be updated with these new products in an organized and usable manner. Each existing product and new product item should be categorized within the database so that it can be found by customers for purchase or employees for stocking. The large number of products offered for sale by a merchant makes updating a merchant's product database human labor intensive and costly if manual labor is used in the current methods and systems. On the other hand, computer based systems can pose accuracy problems that is unacceptable in the current market place. There have been traditionally several challenges with classification models correctly identifying key words in order to provide an accurate classification. For example, how to generate a keyword list for each product type, such that the list of keywords contains the useful and important key words to describe the items within the product type. Additionally, there could be many words appearing in the titles or the descriptions of an item that are not important and different words have different importance with regards to classifying the new product item within a product type.

These problems and other problems persist with the use of computers and current computing systems. The disclosed methods and systems herein, provide more efficient and cost effective methods and systems for merchants to keep product databases up to date with new product offerings. More specifically, the disclosed methods and systems involve computer program products for automatically determining key words within item information with product types, and classifying new items within product types within a merchant's database.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

The present disclosure extends to methods, systems, and computer program products for updating a merchant's database with new product items by selecting and ranking keywords for each product type. In the following description of the present disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure.

Implementations of the present disclosure may comprise or utilize a special purpose or general-purpose computer including computer hardware, such as, for example, one or more processors and system memory, as discussed in greater detail below. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures that can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. It should be noted that any of the above mentioned computing devices may be provided by or located within a brick and mortar location. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the disclosure can also be used in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, e.g., on-demand self-service, broad network access, resource pooling, rapid elasticity, measured service, or any suitable characteristic now known to those of ordinary skill in the field, or later discovered), service models (e.g., Software as a Service (SaaS), Platform as a Service (PaaS), Infrastructure as a Service (IaaS), and deployment models (e.g., private cloud, community cloud, public cloud, hybrid cloud, or any suitable service type model now known to those of ordinary skill in the field, or later discovered). Databases and servers described with respect to the present disclosure can be included in a cloud model.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

Figure 1:
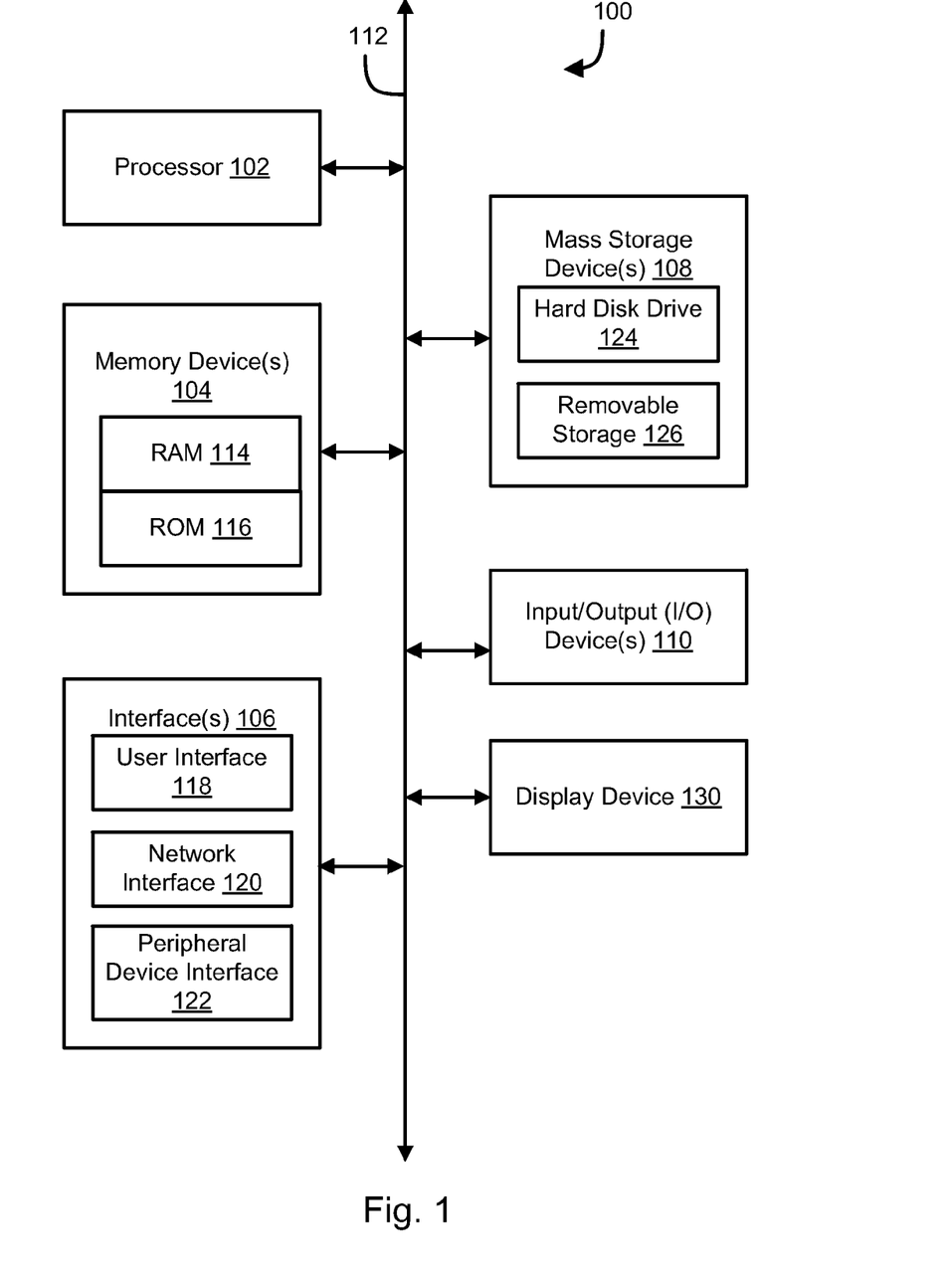
FIG. 1 illustrates an example block diagram of a computing device.

FIG. 1 is a block diagram illustrating an example computing device 100. Computing device 100 may be used to perform various procedures, such as those discussed herein. Computing device 100 can function as a server, a client, or any other computing entity. Computing device can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer readable media, such as magnetic tapes, magnetic disks, optical disks, solid-state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 may include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device (s) 110 to communicate with one another, as well as other devices or components coupled to bus 112. Bus 112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2:
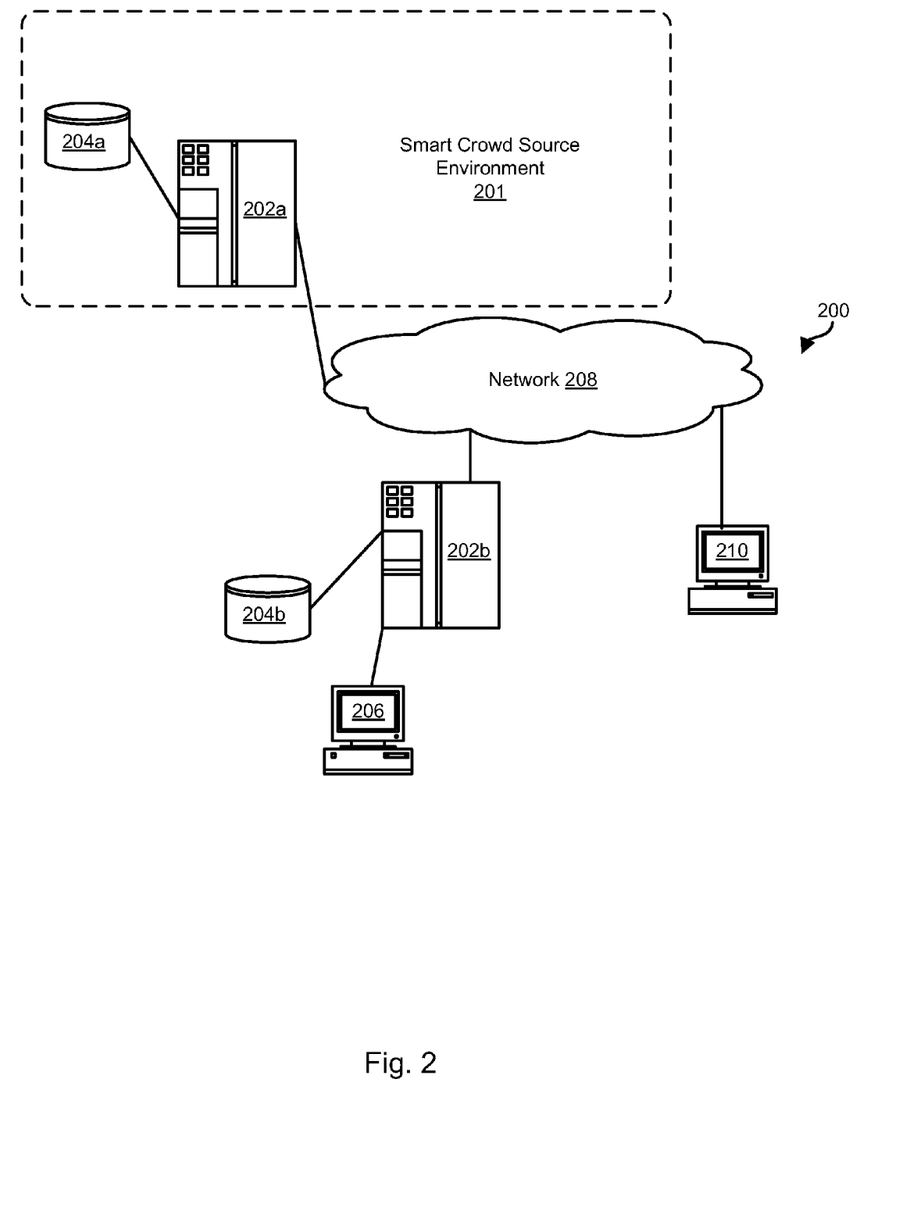
FIG. 2 illustrates an example computer architecture that facilitates different implementations described herein.

FIG. 2 illustrates an example of a computing environment 200 and a smart crowd source environment 201 suitable for implementing the methods disclosed herein. In some implementations, a server 202a provides access to a database 204a in data communication therewith, and may be located and accessed within a brick and mortar retail location. The database 204a may store customer attribute information such as a user profile as well as a list of other user profiles of friends and associates associated with the user profile. The database 204a may additionally store attributes of the user associated with the user profile. The server 202a may provide access to the database 204a to users associated with the user profiles and/or to others. For example, the server 202a may implement a web server for receiving requests for data stored in the database 204a and formatting requested information into web pages. The web server may additionally be operable to receive information and store the information in the database 204a.

As used herein a smart crowd source environment is a group of users connected over a network that may be assigned tasks to perform over the network in mass. In an implementation the smart crowd source may be in the employ of a merchant, or may be contracted with on a per task basis as may be common in the crowd source community. The work product from the smart crowd source is generally conveyed back to the system over the same network that supplied the tasks to be performed. In the implementations that follow, users or members of a smart crowd source may be tasked with reviewing the computer generated classification of new product items to insure that the automatically performed processes of the method have created a classification that is accurate, complete and relevant. In an implementation, a smart crowd source may be presented with a hierarchy of products within a merchant's database that also comprises the classification of the new product placed within the hierarchy relative to existing items in the hierarch, and accordingly check to see if the new product item is placed correctly in the hierarchy.

A server 202b may be associated with a merchant or by another entity or party providing merchant services. The server 202b may be in data communication with a database 204b. The database 204b may store information regarding various products. In particular, information for a product may include a name, description, categorization, reviews, comments, price, past transaction data, and the like. The server 202b may analyze this data as well as data retrieved from the database 204a in order to perform methods as described herein. An operator or customer/user may access the server 202b by means of a workstation 206, which may be embodied as any general purpose computer, tablet computer, smart phone, or the like.

The server 202a and server 202b may communicate with one another over a network 208 such as the Internet or some other local area network (LAN), wide area network (WAN), virtual private network (VPN), or other network. A user may access data and functionality provided by the servers 202a, 202b by means of a workstation 210 in data communication with the network 208. The workstation 210 may be embodied as a general purpose computer, tablet computer, smart phone or the like. For example, the workstation 210 may host a web browser for requesting web pages, displaying web pages, and receiving user interaction with web pages, and performing other functionality of a web browser. The workstation 210, workstation 206, servers 202a-202b, and databases 204a, 204b may have some or all of the attributes of the computing device 100.

It is to be further understood that the phrase "computer system," as used herein, shall be construed broadly to include a network as defined herein, as well as a single-unit work station (such as work station 206 or other work station) whether connected directly to a network via a communications connection or disconnected from a network, as well as a group of single-unit work stations which can share data or information through non-network means such as a flash drive or any suitable non-network means for sharing data now known or later discovered.

Figure 3:
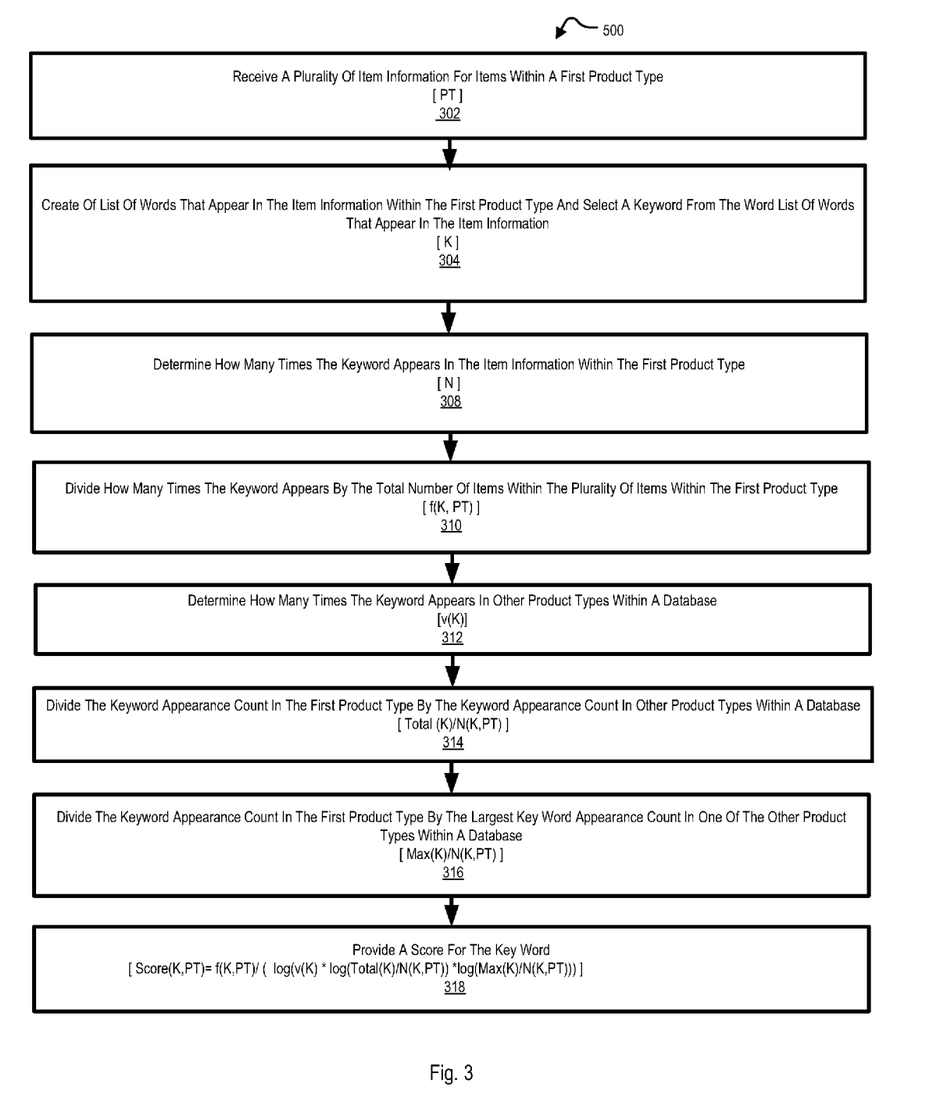
FIG. 3 illustrates a flow chart of an example method according to one implementation.

With reference primarily to FIG. 3, an implementation of a method 300 for determining keywords used for product types within a merchant's database will be discussed. FIG. 1 and FIG. 2 may be referenced secondarily during the discussion in order to provide hardware support for the implementation.

The method 300 may include the database 204a (or any suitable memory device disposed in communication with the network 208) receiving a plurality of item information for a first product type comprising existing items currently within a merchant's database at 302. For scoring purposes, as will be developed below as the description continues, the first product type is denoted as PT as shown in FIG. 3.

At 304, the system may create of list of words that appear in the item information within the first product type and may select a keyword from the word list of words that appear in the item information for the plurality of item information. The list of words may be stored in computer memory within computing environment 200. For scoring purposes, that will continue to be developed as the description of the present implementation continues, the selected key word is denoted as K as shown in FIG. 3.

At 308, the system may determine how many times the keyword K appears in the item information within the first product type by counting the number of times the key word appears. The count may be stored in computer memory within computing environment 200. For scoring purposes, that will continue to be developed as the description of the present implementation continues, the selected key word count is denoted as N as shown in FIG. 3.

At 310, the system may divide how many times the keyword appears by the total number of items within the plurality of items within the first product type. For scoring purposes, that will continue to be developed as the description of the present implementation continues, the calculation value is denoted as f(K, PT) as shown in FIG. 3.

At 312, the system may determine how many times the keyword appears in other product types within a database by counting the number of times the appears in the item information in all of the other products in other product types within the merchant database. For scoring purposes, that will continue to be developed as the description of the present implementation continues, the count is denoted as v(K) as shown in FIG. 3.

At 314, the system may divide the keyword appearance count in the first product type by the keyword appearance count in all of the other product types within a database. For scoring purposes, that will continue to be developed as the description of the present implementation continues, the calculation value is denoted as Total (K)/N(K,PT) as shown in FIG. 3. As with all of the calculations discussed herein, the calculation value may be stored in computer memory such that it can be retrieved for later use by the system.

At 316, the system may divide the keyword appearance count in the first product type by the largest key word appearance count of one of the other product types within the merchant's database. For scoring purposes, that will continue to be developed as the description of the present implementation continues, the calculation value is denoted as Max(K)/N(K, PT) as shown in FIG. 3. As with all of the calculations discussed herein, the calculation value may be stored in computer memory such that it can be retrieved for later use by the system.

At 318, the system may score the keyword for use in classifying new product items in the future using the above derived counts and calculation values in the equation:

$$\text{Score}(K,PT) = f(K,PT)/(\log(v(K) * \log(\text{Total}(K)/N(K, PT)) * \log(\text{Max}(K)/N(K,PT))).$$

As will be discussed in further detail below, the keyword score may be used to determine a list of keywords corresponding to the product type of the plurality of item information from which the keywords were derived.

For example, in use an implementation may comprise a merchant's database wherein keywords for the product type of "toilet tanks" The key words (text terms) from performing the method of the implementation in such an example, are:
Keyword: weight (score)
gpf: 58.14666380567963,
tank: 58.13155035361431,
wellworth: 50.247202950187855,
k-4493: 33.14913706305673,
insulin: 32.575927367680386,
standard 4114: 32.33070662440876,
trip: 30.349316934971878,
toilet: 30.06159083963349,
vitreou: 29.82935989257119,
yorkvil: 28.444236142746906,
cimarron: 27.755782721931112,
pf3210: 27.610288831667027,
up200: 24.98472185995258,
pf4201: 24.98472185995258,
rockton: 20.630209065762838,
doral: 20.556930131538156,
a104: 20.50556825362112,
cranada: 20.50556825362112,
pf3112: 17.817440124318853,
cadet: 17.225579729402423,
china: 16.5265402240042
k-4397: 16.08149808040493,
highlin: 16.043051960625927,
kohler: 15.996144199268214,
wall-hung: 15.6910682270146,
lever: 14.946888563432543,
onli: 14.863765654187059,
a105: 13.515879013829716,
pf3110: 13.515879013829716,
pf3612: 12.49236092997629,
devoro: 11.060505765804779,
orrington: 10.873790275353075,
stinson: 9.86290971335801,
memoir: 9.693642370136214,
persuad: 9.638752482410029,
6gpf: 9.614974950654652,
h2option: 9.030551300390414
left: 8.554830470919141.

As can be seen from the example list for toilet tanks, the scores range from ~8.5 up to ~58. It should be noted that the scores may only have relative value and may only be of use for comparison purposes. Accordingly, a list of the most relevant keywords may be created by simply selecting the terms having the highest score such as:
gpf: 58.14666380567963,
tank: 58.13155035361431,
wellworth: 50.247202950187855,
k-4493: 33.14913706305673,
insulin: 32.575927367680386,
standard 4114: 32.33070662440876,
trip: 30.349316934971878,
toilet: 30.06159083963349,
vitreou: 29.82935989257119,
yorkvil: 28.444236142746906,
cimarron: 27.755782721931112.

Thus as can be seen by the example a keyword list can be created by machines within a computing environment without human involvement by practicing the methods of the discloser. However, it should be noticed that the list of keywords contains several words that may not make sense in the real world for useful classification purposes. The possible nonsense words that received a relatively high score are:
gpf: 58.14666380567963, and
k-4493: 33.14913706305673.
However, these terms may be relevant in the product type, and human involvement may be desired to review and curate the keyword list.

Figure 4:
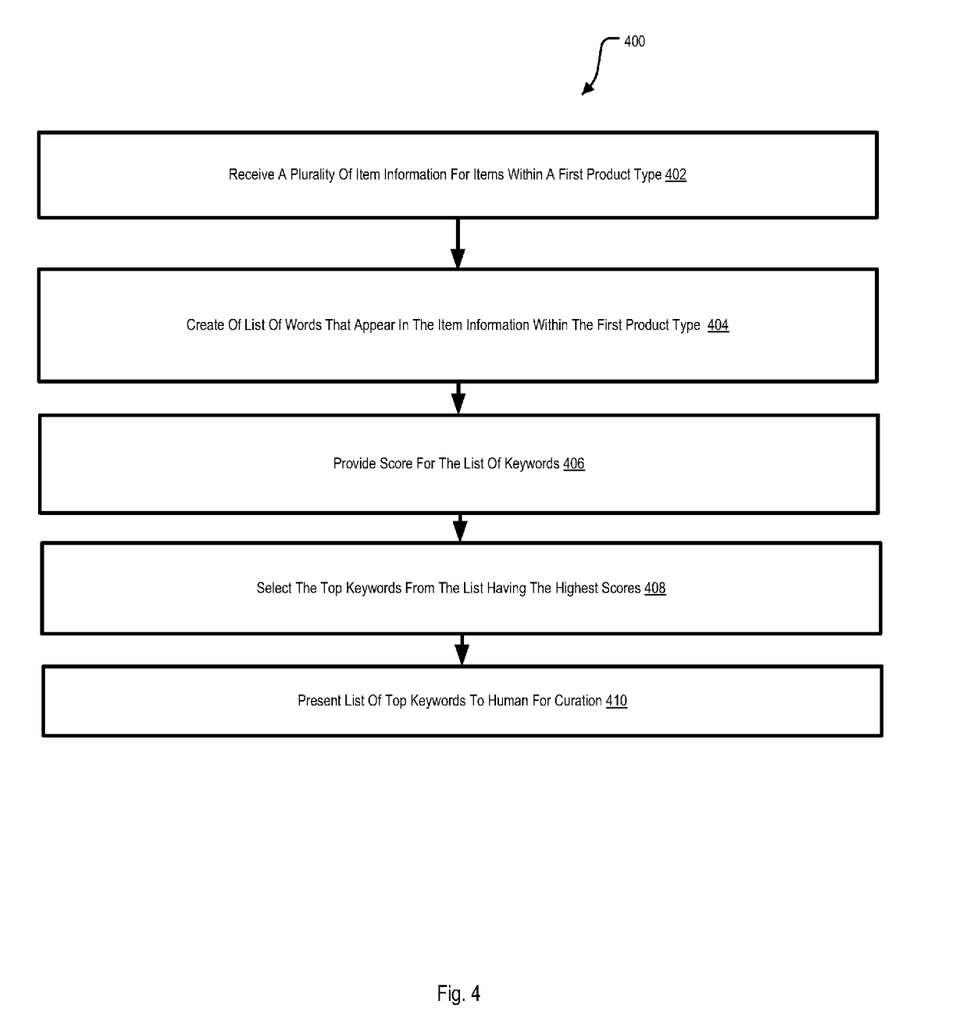
FIG. 4 illustrates a flow chart of an example method according to one implementation.

With reference primarily to FIG. 4, a method and system will be discussed for providing the keyword list to a human for curation. Similar to method 300 discussed above, at 402, 404, 406 and 408, a plurality of item information for a product type is received and processed to create a list of keywords that have been scored and selected for list based on the highest score.

At 410, the list may be presented to a human over a network for curation. The human may review the list for terms that may not make sense for classification. For example, the keyword "china" received a score of ~16 but may not be relevant for classification for the product type. Accordingly, during curation a human may choose to delete the keyword "china" from the list. It should be noted that the human may be part of a smart crowd source environment 201. The smart crowd users may be connected over a network, or may be located within a brick and mortar building owned by the merchant. The smart crowd users maybe employees and representatives of the merchant, or may be outsourced to smart crowd communities. Thus it can be seen by the example and discussion of FIG. 4 that the keyword list may be improved by human involvement. It should also be noted that the system may delete items automatically that have received a weak score.

Figure 5:
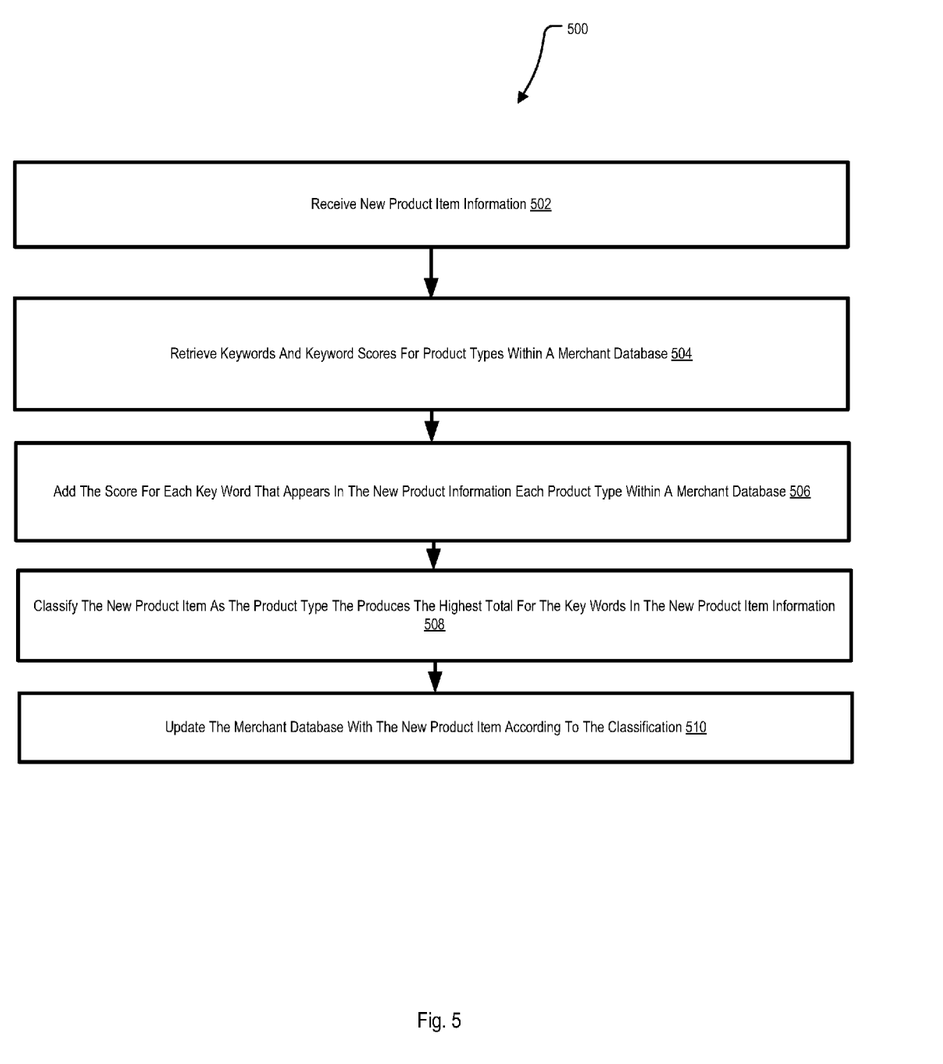
FIG. 5 illustrates a flow chart of an example method according to one implementation.

With reference primarily to FIG. 5, an implementation for classifying new products for updating a merchant's database will be discussed. The method 500 may be performed on a system that may include the database storage 204*a* (or any suitable memory device disposed in communication with the network 208) receiving a new product item information at 502 representing the new product item to be added to the merchant database. The product item information may be stored in memory located within computing environment 200. The product item information may be received in digital form from an electronic database in communication with the merchants system, or may be manually input by a user. The product item information may comprise a title, a description, parameters of use and performance, and any other suitable information associated with the product that may be of interest in a merchant environment for classifying and categorizing the product item.

At 504, the system may retrieve a keywords and keyword scores as discussed above in method 300 and method 400 corresponding to the product types within the merchant database.

At 506, the system may tally or add the keyword scores for each keyword found in the new product item information received at 502 for each and every keyword list corresponding to all of the product types.

At 508, the system may create a product type classification for the new product item based on the keyword list corresponding to one of the product type that has the highest tally. In other words, the product type having the most keywords and the strongest keywords in common with the new product item will be classified as the new product item's product type.

At 510, the merchant database may be updated with the new product item. Thus the disclosure provides a method and system for establishing keywords for classifying new products in a merchant's database.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

The invention claimed is:

1. A computer implemented method for categorizing new product items within a merchant's database of product offerings, comprising:
   a computer receiving new product item information;
   the computer receiving a keyword list and keyword scores for product types within the merchant's database;
   wherein the keyword scores are determined by:
      the computer receiving a plurality of item information for items within a first product type;
      the computer creating a list of words that appear within the plurality of item information within the first product type;
      the computer selecting a keyword from the list of words that appear within the plurality of item information within the first product type;
      the computer determining a first value of how many times the keyword appears in the plurality of item information within the first product type;
      the computer determining a second value by dividing the first value of how many times the keyword appears in the plurality of item information by a count of how many items are represented in the first product type;
      the computer determining a third value of how many times the keyword appears in other product types within the merchant's database;
      the computer determining a fourth value by dividing the first value of how many times the keyword appears in the first product type by the third value of how many times the keyword appears in the other product types within the merchant's database;
      the computer determining a fifth value by dividing the first value of how many times the keyword appears in the first product type by a largest number of times the keyword appears in one of the other product types within the merchant's database; and
      the computer providing a score for the keyword using the first value, the second value, the third value, the fourth value, and the fifth value;
   the computer, for the product types within the merchant's database, creating product type totals by adding keyword scores for words from within the new product item information that match keywords from the keyword list for the other product types within the merchant's database;
   the computer classifying a classification for a new product item of the new product items as a product type for the product types within the merchant database producing a highest product type total; and
   the computer updating the merchant's database with the classification for the new product item.

2. The method according to claim 1, further comprising: presenting over a network the keyword list to a user for review and curation.

3. The method according to claim 1, wherein the keyword list is comprised of words from the list of words that appear within the plurality of item information for items within the first product type having largest scores of the keyword scores relative to other words from the list of words that appear within the plurality of item information for items within the first product type.

4. The method according to claim 3, further comprising: presenting over a network the keyword list to a user for review and curation.

5. The method according to claim 1, wherein the plurality of item information comprises a title of items within the first product type.

6. The method according to claim 1, wherein the plurality of item information comprises a description for items within the first product type.

7. The method according to claim 2, wherein keywords are removed from the keyword list after curation.

8. A system for categorizing new product items within a merchant's database of product offerings comprising:
   a computer having one or more processors and one or more memory devices operably coupled to the one or more processors and storing executable and operational data, the executable and operational data programmed to cause the one or more processors to:
   receive new product item information;
   receive a keyword list and keyword scores for product types within the merchant's database;
   wherein the keyword scores are determined by:
      receiving a plurality of item information for items within a first product type;
      creating a list of words that appear within the plurality of item information within the first product type;
      selecting a keyword from the list of words that appear within the plurality of item information within the first product type;
      determining a first value of how many times the keyword appears in the plurality of item information within the first product type;
      determining a second value by dividing the first value of how many times the keyword appears in the plurality of item information by a count of how many items are represented in the first product type;
      determining a third value of how many times the keyword appears in other product types within the merchant's database;
      determining a fourth value by dividing the first value of how many times the keyword appears in the first product type by the third value of how many times the keyword appears in all of the other product types within the merchant's database;
      determining a fifth value by dividing the first value of how many times the keyword appears in the first product type by a largest number of times the keyword appears in one of the other product types within the merchant's database; and providing a score for the keyword using the first value, the second value, the third value, the fourth value, and the fifth value;

add keyword scores for words from within the new product item information that match keywords from the keyword list for the other product types within the merchant's database to create product type totals;

classify a classification for a new product item of the new product items as a product type for the product types producing a highest product type total; and update the merchant's database with the classification for the new product item.

9. The system according to claim 8, further comprising: presenting over a network the keyword list to a user for review and curation.

10. The system according to claim 8, wherein the keyword list is comprised of words from the list of words that appear within the plurality of item information for the first product type having largest scores of the keyword scores relative to other words from the list of words that appear within the plurality of item information for the first product type.

11. The system according to claim 10, further comprising: presenting over a network the keyword list to a user for review and curation.

12. The system according to claim 8, wherein the plurality of item information comprises a title of items within the first product type.

13. The system according to claim 8, wherein the plurality of item information comprises a description for items within the first product type.

14. The system according to claim 9, wherein keywords are removed from the keyword list after curation.

* * * * *